RELEASE OF $ClO_2$ BY ADDITION OF SMALL AMOUNTS OF NaCl AND ACID

TIME VS. $ClO_2$ PRODUCTION FOR ACID RELEASE OF STABILIZED CHLORINE DIOXIDE

FRACTION OF STABILIZED CHLORINE DIOXIDE CONVERTED TO $ClO_2$ UPON ACIDIFICATION

INVENTOR
GILBERT GORDON

ATTORNEYS

United States Patent Office 3,585,147
Patented June 15, 1971

3,585,147
STABILIZED CHLORINE DIOXIDE SOLUTIONS CONTAINING A CHLORIDE AND PROCESSES OF MAKING AND USING SAME
Gilbert Gordon, Iowa City, Iowa, assignor to International Dioxcide, Inc., New York, N.Y.
Continuation-in-part of application Ser. No. 711,024, Mar. 6, 1968. This application Oct. 1, 1969, Ser. No. 862,743
Int. Cl. C01b 11/02
U.S. Cl. 252—187
12 Claims

ABSTRACT OF THE DISCLOSURE

Addition of a chloride of an alkali or alkaline earth metal increases the yield and rate of release of chlorine dioxide from solutions of alkali metal chlorite or stabilized chlorine dioxide.

---

This application is a continuation-in-part of my application Ser. No. 711,024 filed Mar. 6, 1968, and now abandoned.

BACKGROUND OF INVENTION

Chlorine dioxide is well known as a strong oxidizing agent which has many commercial and industrial applications. It is used for bleaching various organic materials such as pulp, textiles or flour; for treating water in food processing plants, cooling towers and other water supplies or effluents; as well as for other sterilizing, antiseptic and deodorizing purposes, including the treatment of various organic wastes, the combatting of pests, the preservation of various resins and glues, and many other cases where oxidizing power or microbiological control is helpful.

However, chlorine dioxide itself is a hazardous material to handle, unstable, and generally difficult to produce and to apply where needed. Even in aqueous solution, chlorine dioxide has chemical and physical characteristics such as an irritating, sharp odor which make many of its applications impractical. It is therefore most commonly used in the form of stabilized aqueous chlorine dioxide solutions or soluble chlorite salt solutions from which chlorine dioxide can be released by acidification. It is also sometimes used in latent form as a dry chlorite salt powder which is made by dehydrating such solutions and which likewise yields chlorine dioxide upon acidification.

Stabilization of aqueous solutions of chlorine dioxide by the addition of stabilizing agents which modify its characteristics sufficiently to make its use in industrial applications more attractive is known. Pat. No. 3,123,521, for example, discloses the stabilization of chlorine dioxide solutions with sodium carbonate peroxide.

It is also known that the chlorites of the alkali and alkaline earth metals, either in dry powder form or in aqueous solution decompose upon acidification to a certain extent to form chlorine dioxide. Pat. No. 2,071,091, for example, discloses such chlorite solutions.

However, when a stabilized chlorine dioxide or chlorite salt solution is acidified by the addition of an acid, such as sulfuric acid, the solution yields not only chlorine dioxide, but also sodium chlorate. Sodium chlorate is a relatively ineffective oxidizing agent as compared to chlorine dioxide. Thus, only a portion of the potential oxidizing power of such a solution is realized.

Further, it is often desirable in applications of chlorine dioxide to be able to control the release of chlorine dioxide from stabilized chlorine dioxide solutions. Although the rate of the release can be increased by increasing the acidity of the solution, increasing the concentration of stabilized chlorine dioxide, or by raising the temperature of the solution, the range of control which these factors provide is necessarily limited, and therefore it is desirable to provide for an even greater range of release of chlorine dioxide.

Still further, the previously known solutions of this type, when evaporated, have characteristically produced a dry metal chlorite residue which was highly explosive in contact with combustible material or on impact when in contact with metal. This hazard has also limited the utility of such solutions in some cases.

SUMMARY OF INVENTION

Accordingly, the primary object of the present invention is to provide a chlorine dioxide release agent for use with solutions of chlorite salt or stabilized chlorine dioxide so as to essentially prevent or alleviate the problems of loss of oxidizing power, lack of control over chlorine dioxide release, and explosive hazard mentioned above.

Other and further objects of the present invention will be apparent to those skilled in the art from the following more detailed description.

The objects of the present invention are attained by including in aqueous solutions containing stabilized chlorine dioxide at least one chloride of a metal selected from the group consisting of the alkali metals and the alkaline earth metals.

It has been found that the aforesaid alkali metal and alkaline earth chlorides have a marked effect on the release of chlorine dioxide during the acidification of aqueous solutions of chlorite salt or stabilized chlorine dioxide and, thus, increase the oxidizing power of the acidified solution. Further, the addition of the chloride enhances both the rate and amount of production of chlorine dioxide and this affords a degree of control over the amounts of chlorine dioxide released in the solution.

DESCRIPTION OF PREFERRED EMBODIMENTS

Figure 1:
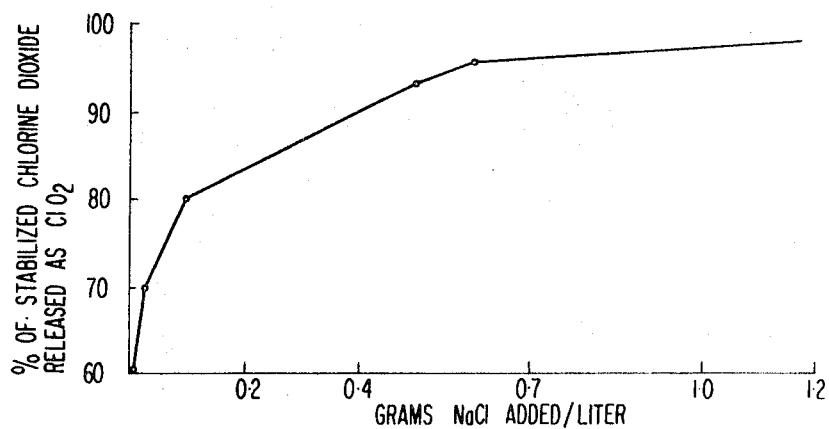
FIG. 1 is a graph showing the effect of added sodium chloride on the amount of chlorine dioxide released.

The improved aqueous solutions which will yield chlorine dioxide upon acidification may be, as previously has been indicated, solutions of stabilized chlorine dioxide such as chlorine dioxide solutions stabilized with sodium carbonate peroxide or sodium percarbonate, or solutions of a chlorite salt as such.

Stabilized chlorine dioxide solutions comprise aqueous solutions of reaction products of chlorine dioxide with alkaline peroxygen compounds. It appears that the alkaline peroxygen compounds stabilize the chlorine dioxide in solution by forming a more stable complex or compound, i.e., the corresponding chlorite, and thus give a more stable solution which has a longer shelf life as well as a solution containing a greater concentration of $ClO_2$ than can be held in solution in the absence of a peroxygen compound.

Stabilized chlorine dioxide solutions of the kind disclosed and claimed in the aforementioned U.S. Pat. 3,123,521 are especially suitable for use as the chlorine dioxide yielding solutions which are improved in accordance with the present invention. However, aqueous solutions of chlorine dioxide which have been stabilized or converted to a chlorite with other alkaline peroxygen compounds are also suitable including those complexed with hydrogen peroxide and an alkali metal hydroxide or alkali salt such as an alkali metal bicarbonate, or an alkaline peroxygen compound such as sodium peroxide or sodium perborate. Generally speaking, when a sodium peroxygen compound is referred to as being useful herein, the corresponding compounds of potassium or lithium may be used as well.

Solutions of the stabilized or complexed chlorine dioxide may be prepared by dissolving the alkali metal peroxygen compound or compounds in water to form an aqueous solution containing about 5 to 15 percent, and preferably 8 to 13 percent, of the peroxygen compound, and then bubbling chlorine dioxide gas through the aqueous solution, preferably until at least about 40,000 p.p.m., and preferably between 50,000 and 75,000 p.p.m., of chlorine dioxide is absorbed therein. For good stability, the solution should be maintained at a pH value between about 7 and about 13 or higher, and preferably between 8 and 12.

In general, the chlorine dioxide gas which is to be used in the stabilized or complex solution should preferably be purified to remove all traces of free chlorine. There are several well-known techniques for accomplishing this separation. Chlorine gas is objectionable since, in aqueous solution, chlorine forms hypochlorous acid. Chlorine has a very sharp odor in concentrations as low as 3.5 parts per million. It is also extremely corrosive.

The alkali metal peroxygen stabilizing or complexing compounds are well known. The preferred ones include sodium carbonate peroxide or hydrogen peroxide with alkaline carbonates and bicarbonates, but alkali metal perborates may also be used if the toxicity imparted by the perborates is not objectionable.

Moreover, the present invention is similarly applicable to aqueous alkali metal chlorite solutions prepared by methods other than the stabilization of chlorine dioxide gas in water by a peroxygen compound, e.g., by direct solution of the appropriate dry chlorite salt in water or in dilute caustic.

The chlorides which are included in the aforesaid solutions are chlorides of alkali metal or alkaline earth metals. Sodium chloride and potassium chloride are preferred, but lithium chloride, calcium chloride, barium chloride, magnesium chloride and the like are also useful. It should be understood that for maximum effect such chlorides are best added to the stabilized chlorine dioxide solutions while the latter are at a pH of at least 5, or preferably 6 or higher, i.e., either before acidification or substantially concurrently therewith. Alternatively, the chloride can first be added to the water which is to be used in preparing the stabilized chlorine dioxide or chlorite solution.

As still another alternative, the chloride may be formed in situ by adding hydrochloric acid to a solution which contains an alkali metal hydroxide or carbonate or bicarbonate. Such chloride formation preferably is at least partially carried out while the pH of the stabilized chlorine dioxide or chlorite solution is at a pH of 5 or more, e.g., between 8 and 12, but additional chloride may be formed when the solution is acidified for the purpose of releasing the chlorine dioxide oxidant.

The chloride should be incorporated into the aqueous solution in an amount effective to increase the generation of chlorine dioxide. This will depend upon the solubility of the chloride as well as the concentration of stabilized chlorine dioxide or chlorite in solution. More particularly, the chloride can usefully be present in amounts from about 0.1 up to about 20 gram moles per gram mole of dissolved chlorine dioxide. For example, the chloride can be present in amounts of from about 0.01 to 100 or even 300 grams, or preferably about 0.1 to 50 grams, or most preferably 2 to 50 grams, per liter of stabilized chlorine dioxide solution. Higher or lower amounts may sometimes be necessary or desirable in increasing the release of chlorine dioxide or in repressing the formation of chlorate, as the optimum amount varies somewhat depending upon, for example, the chlorine dioxide concentration, acidity or temperature of the final solution. The optimum is best determined by a few preliminary empirical tests.

Aqueous solutions of stabilized or complexed chlorine dioxide are stable as long as the solutions are substantially neutral or alkaline, as reflected by a pH of 7 or higher. However, if such solutions are acidified by the addition of a strong mineral acid, such as sulfuric acid, the solution will decompose to give mainly chlorine dioxide and sodium chlorate. In accordance with the present invention the amount of chlorine dioxide in terms of percentage of oxidizing power in final solution is greatly increased and the formation of chlorate is reduced.

Though the mechanism by which chlorine doxide is released when a chlorite salt is acidified is known to be complicated and many different reactions can take place in such a process, the mechanism can for the sake of convenience be adequately represented by the following series of hypothetical equations:

(1) $\quad 10NaClO_2 + 5H_2SO_4 \rightarrow 10HClO_2 + 5Na_2SO_4$ (2) $\quad\quad\quad 10HClO_2 \rightarrow 8ClO_2 + 2HCl + 4H_2O$ (3) $\quad\quad\quad 8ClO_2 + 4H_2O \rightarrow 4HClO_2 + 4HClO_3$ Surprisingly, when NaCl is admixed with the chlorite prior to or during the acidification step (1), step (3) which is responsibile for the unwanted chlorate formation is repressed.

The present invention is further illustrated by the following examples. In these examples as well as in all other parts of this specification and of the appended claims all parts and percentages of materials are given on a weight basis unless otherwise indicated.

EXAMPLE I

A stabilized chlorine dioxide solution is prepared by dissolving powdered sodium carbonate peroxide in water to form a 10% solution. The stabilizing compound, sodium carbonate peroxide, is an addition compound of sodium carbonate and hydrogen peroxide, approximately corresponding to the formula $2Na_2CO_3 \cdot 3H_2O_2$. This compound as available commercially is a white powder containing 14% active oxygen and 29% hydrogen peroxide. Its solubility in water at 20° C. is 13.3%. In powdered form, the compound is relatively stable.

When the stabilized chlorine dioxide solution is intended to serve as a source of dry sodium chlorite upon evaporation, or when accidental evaporation to dryness in use is to be allowed for and the attendant explosive hazard is to be minimized, it is desirable to include between about 0.1 and 20, preferably between about 0.3 and 2, and most preferably between 0.5 and 1, moles sodium chloride or similar soluble hygroscopic chloride per mole of chlorine dioxide or chlorite present in the solution and to avoid exposing the dry residue to temperatures above about 90° C. Solutions of sodium carbonate peroxide in water have characteristics similar to a solution prepared by separately dissolving hydrogen peroxide and sodium carbonate in water. The former solution, however, is more stable.

Chlorine dioxide gas which contains substantially no free chlorine is then bubbled through the solution of sodium carbonate peroxide. Approximately 568 mg. of gaseous chlorine dioxide is taken up per gram dry weight of sodium carbonate peroxide. A stabilized chlorine dioxide solution prepared in accordance with this method contains about 50,000 p.p.m. of chlorine dioxide at a pH value between 8 and 12.

This solution was then diluted 200 fold. In rapid succession sulfuric acid was added to obtain an acidity of 1.0 mole of hydrogen ions per liter of diluted solution and six grams of sodium chloride was then added per liter of diluted solution.

It was then found that 98% of the oxidizing power of this solution appeared as chlorine dioxide and only 2% as sodium chlorate.

On the other hand, for the same solution (200 times diluted), upon addition of the same amount of sulfuric acid as before but in the absence of any added sodium chloride, only 60% of the oxidizing power appeared as chlorine dioxide and 40% as sodium chlorate.

Oxidizing power was measured by iodometric determinations and simultaneous spectrophotometric analysis. The molar extinction coefficient ($e$) of chlorine dioxide is 1240 $M^{-1}$ cm.$^{-1}$ at 3600 A. Since the absorbtivity of the solution can be measured directly at 3600 A. and the absorbtivity (abs.), is defined as (abs.) = ($e$) (concentration) (path length)

the $ClO_2$ is thus determined. Samples were simultaneously added to sodium iodide solution in 0.1 M acid. The iodine formed is back titrated with standard thiosulfate solution. The titer of this solution gives the sum of the $ClO_2$ and $ClO_2^-$ (chlorite ion) concentrations. The spectrometric value for the $ClO_2$ concentration is subtracted in order to obtain the $ClO_2^-$ directly. A third sample of the solution was added to excess sodium iodide, in the absence of air, in 6 M HCl. The iodine liberated was back titrated with standard thiosulfate solution. This titration gives the total oxidizing power, to wit, $ClO_2$, $ClO_2^-$ and $ClO_3^-$. Thus the $ClO_3^-$ concentration can be obtained by difference (titration 3−tritation 2).

EXAMPLES II–VI

The results of Examples II through VI using varying amounts of sodium chloride are summarized in Table 1 and shown in FIG. 1. As in Example I, the initial solution containing 50,000 p.p.m. of stabilized chlorine dioxide was diluted 200 times, the indicated quantity of sodium chloride was added and the acidity for all examples was adjusted to 1.0 mole hydrogen ion per liter of solution. Similar results, in terms of percent oxidizing power, were found for 100, 200, 300, 400, and 500 times diluted solution, i.e., in solutions containing from less than 0.01% to 0.1% or even as much as 6% stabilized chlorine dioxide. The percent chlorine dioxide released from the stabilized chlorine dioxide solution does not appear to depend markedly on the dilution factor when protected by the addition of the soluble metal chloride.

TABLE 1

Release of $ClO_2$ from stabilized solutions of chlorine dioxide by addition of acid and NaCl

| Example | Grams NaCl added per liter of diluted solution | Oxidizing power in final solution | |
|---|---|---|---|
| | | Percent $ClO_2$ | Percent $ClO_3^-$ |
| II | 2.5 | 97 | 3 |
| III | 0.6 | 96 | 4 |
| IV | 0.5 | 94 | 6 |
| V | 0.1 | 80 | 20 |
| VI | 0.03 | 70 | 30 |
| Control | None | 60 | 40 |

Figure 2:
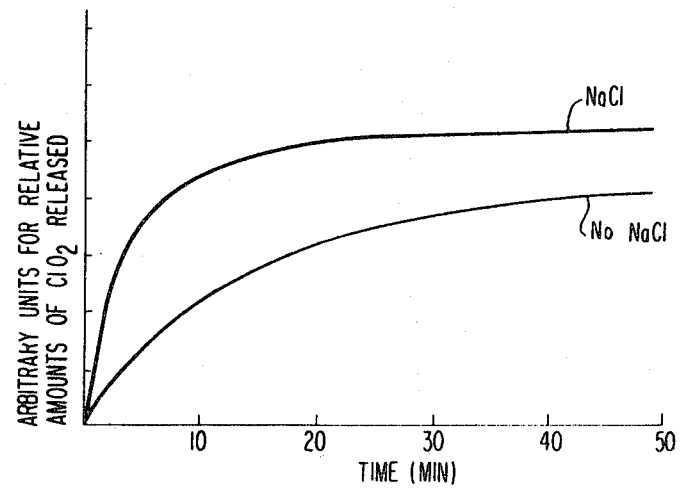
FIG. 2 is a graph showing the effect of added sodium chloride on the time needed for release of chlorine dioxide.

Additional data was collected to show the length of time needed for release of chlorine dioxide by the addition of acid alone as compared with the addition of acid plus one gram of sodium chloride per liter of solution of stabilized chlorine dioxide. A graph of typical results is shown in FIG. 2. The data for the graph of FIG. 2 were obtained with the 200 fold diluted solution of stabilized chlorine dioxide with enough sulfuric acid to give a pH of 2.0.

At the end of 5 minutes the acidified solution containing the added sodium chloride yielded more than twice as much $ClO_2$ as the control solution yielded after the same interval, and yielded about the same amount of $ClO_2$ as the control solution yielded after 40 minutes or more. At the end of the test period (about 50 minutes), about 50% more $ClO_2$ was released when the solution was acidified in the presence of added chloride as compared with the control solution. In effect, under these conditions more than 90% of the total potentially available $ClO_2$ is released as such from the chloride containing solution by the end of 20 minutes whereas in the case of the control solution less than 80% of the total potentially available $ClO_2$ is released by the end of 10 hours.

Figure 3:
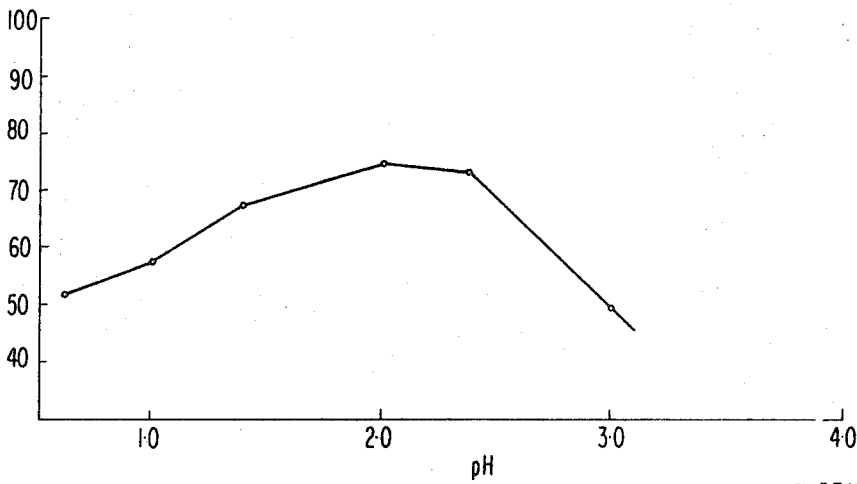
FIG. 3 is a graph showing the effect of pH on the amount of chlorine dioxide released.

Additional data were also collected to show the effect of hydrogen ion concentration upon the percentage of stabilized chlorine dioxide released as chlorine dioxide. A graph of typical results is shown in FIG. 3. The data for the graph of FIG. 3 were obtained with a 300 fold dilution of the original stabilized chlorine dioxide prepared in Example I, at a temperature of about 25° C. At pH values above 3, the reaction becomes extremely slow, taking several days at such lower hydrogen ion concentrations and yielding primarily chlorate ions $ClO_3^-$ with only a minor proportion of $ClO_2$. At pH values below about 1.5 the reaction is rapid but as the pH is reduced below the optimum the ratio of released $ClO_2$ to released chlorate tends to approach unity. The optimum pH depends somewhat on the temperature at which the solution is used, but quite generally a pH between 1 and 3, and particularly between 2 and 3, is about best. ($Cl^-/ClO_2^-$) ratios of greater than 10 could possibly also affect the optimum by allowing the solutions to be more acid and still giving good yields.

EXAMPLE VII

To illustrate the effect of the present invention on the explosive properties of the dry product, 100 ml. portions of solutions having the identical compositions as that of Example II (containing 2.5 g. NaCl per liter) and the Control (no NaCl) shown in Table 1, respectively, may be concentrated in porcelain dishes on a steam bath until solids begin to precipitate from solution and the concentrated solutions may then be evaporated to dryness in air.

The resulting solid residues or powders are then placed on a steel sheet and struck with a metal hammer. The residue from the Control solution detonates upon impact whereas the chloride-containing residue from the solution of Example II does not.

EXAMPLE VIII

As shown below, the benefits which the present invention produces can be obtained not only when the alkali metal chloride is added as such to a previously formed stabilized chlorine dioxide or chlorite salt solution, but also when it is formed in situ, e.g., by the reaction of sodium carbonate and hydrochloric acid. The chloride salt can thus be included or formed in the peroxide-containing solution before chlorine dioxide is absorbed therein, or it can be included or formed therein after the chlorine dioxide has been dissolved and stabilized therein.

Accordingly, for instance, the invention may be practiced in any of the following ways.

(A) Include NaCl in absorbing solution before $ClO_2$ absorption

Dissolve 10 parts sodium carbonate peroxide ($2Na_2CO_3 \cdot 3H_2O_2$)

and 10 parts sodium chloride in 100 parts demineralized water and bubble through the resulting solution a gas mixture containing about 5% by volume of chlorine-free chlorine dioxide in air at a temperature of about 25° C. until a solution containing 60,000 p.p.m. chlorine dioxide is formed. Upon acidification to a pH between 2 and 3, with or without substantial dilution, this solution is capable of releasing $ClO_2$ at a high rate in a yield of 95% or better, with only a very small yield of unwanted chlorate.

(B) Form NaCl in absorbing solution before $ClO_2$ absorption

Dissolve 120 grams sodium carbonate peroxide in 400 ml. distilled water and add more water to make 500 ml. of Solution I. This contains the equivalent of 16.8 grams active oxygen and 84 grams sodium bicarbonate.

Separately prepare Solution II by dissolving 133 grams sodium bicarbonate (1.58 mole) in about 375 grams water, slowly adding 100 grams concentrated hydrochloric acid (36.5% HCl; 1.03 mole), and making up to 500 ml. with further addition of water. An aqueous solution containing about 1 mole NaCl and about 0.5 mole $NaHCO_3$ is produced as the acid reacts with the bicarbonate.

When evolution of gas has stopped in Solution II, add Solution I to Solution II with agitation and make up to 1 liter with further addition of water.

Bubble through resulting mixed solution in a glass column a gas mixture of chlorine-free $ClO_2$ and air containing about 5% by volume $ClO_2$ until the solution becomes saturated with $ClO_2$ as indicated by $ClO_2$ gas being present in the effluent gases at the top of the column. The resulting solution will contain about 63,000 p.p.m. $ClO_2$ in stabilized and free form. A small excess of free $ClO_2$ is then stripped from the solution by aeration or aging until the $ClO_2$ content becomes constant. The solution then is free of chlorate ions and hydrogen peroxide, but contains both stabilized chlorine dioxide (chlorite) and chloride ions.

This solution when acidified to a pH below 5, preferably between 2 and 3, with or without substantial dilution, again is capable of rapidly releasing more than 95% of its potential $ClO_2$ content, with only a small yield of unwanted chlorate.

(C) Form NaCl in absorbing solution after $ClO_2$ absorption

Prepare 500 ml. of Solution I as in Procedure B above.

Separately prepare Solution III by dissolving 133 grams sodium bicarbonate in 375 grams water and making up to 500 ml. by further addition of water.

Add Solution I to Solution III with agitation and make up to 1 liter with further addition of water.

Bubble $ClO_2$-air mixture through the resulting mixed solution as in Procedure B until the solution becomes saturated with $ClO_2$ (Solution IV).

Then slowly add 100 grams concentrated hydrochloric acid (36.5% HCl) to Solution IV with rapid stirring, thereby forming NaCl in the solution with evolution of carbon dioxide while leaving an excess of bicarbonate present. The evolution of carbon dioxide speeds the aging of the stabilized chlorine dioxide solution by helping to strip out excess free $ClO_2$, but in all other respects the resulting solution has substantially the same properties and performance characteristics as the stabilized chlorine dioxide solution prepared by Procedure B.

While the invention has been illustrated above in terms of certain preferred embodiments, still other variations and modifications are of course possible within the scope and spirit of the present invention.

The invention is particularly defined and pointed out in the appended claims.

I claim:

1. An aqueous solution containing stabilized chlorine dioxide dissolved therein in the form of an alkali metal chlorite at a pH between about 7 and 13 and adapted to release chlorine dioxide upon acidification to a pH of less than about 6, and a chloride of a metal selected from the group consisting of the alkali metals and the alkaline earth metals; said chloride present in an amount effective to increase the release of said chlorine dioxide from said solution.

2. The composition of claim 1 wherein said solution contains the equivalent of from about 8 to about 13 percent sodium carbonate peroxide.

3. The composition of claim 1 wherein the pH is between about 8 and about 12, said stabilized chlorine dioxide is present in a concentration of more than 40,000 p.p.m. and said chloride is present in an amount providing from about 0.1 to 20 moles chloride per mole of chlorine dioxide.

4. The composition of claim 1 wherein said chloride is sodium chloride present in an amount of from about 0.01 to 300 grams per liter of solution.

5. The composition of claim 1 wherein sodium chloride is present in a concentration between about 0.1 and 50 grams per liter.

6. A substantially dry, solid, detonation resistant alkali metal chlorite composition consisting essentially of between about 0.3 and 2 moles alkali metal chloride per mole of chlorite.

7. In the process of making an aqueous solution having a pH between about 8 and 12 and containing stabilized chlorine dioxide dissolved therein for release of gaseous chlorine dioxide upon acidification, the improvement which comprises including a chloride of a metal selected from the group consisting of the alkali metals and the alkaline earth metals in said solution in an amount between 0.1 and 20 moles chloride per mole of chlorine dioxide and effective to increase the release of chlorine dioxide upon acidification.

8. A process for producing a stabilized chlorine dioxide solution which comprises passing chlorine dioxide gas through an aqueous solution having a pH between about 7 and 13 and containing about 5 to 15 percent of a peroxygen compound and about 0.1 to 300 grams of an alkali metal chloride per liter.

9. A process according to claim 8 wherein said peroxygen compound is sodium carbonate peroxide and wherein sodium chloride is present in a concentration between about 0.1 and 50 grams per liter.

10. In the process of using an aqueous alkaline solution comprising stabilized chlorine dioxide dissolved therein for release of chlorine dioxide gas therefrom upon acidification, the improvement which comprises increasing the release of chlorine dioxide from the solution by adding a chloride of a metal selected from the group consisting of the alkali metals and the alkaline earth metals in an amount effective to increase the yield of liberated chlorine dioxide gas.

11. The process of claim 10 wherein said chlorine dioxide is present in said solution in a concentration greater than 40,000 p.p.m. $ClO_2$ and in the form of sodium chlorite and wherein sodium chloride is included in said solution in an amount corresponding to about 0.1 to 20 moles per mole of dissolved $ClO_2$ at a stage in the process when the solution is at a pH of not less than 6.

12. The process of claim 11 wherein said sodium chloride is added in an amount of from about 0.01 to 300 grams per liter of solution.

References Cited

UNITED STATES PATENTS

| 2,833,624 | 5/1958 | Sprauer | 23—152 |
| 2,895,801 | 7/1959 | Northgraves et al. | 23—152 |
| 2,936,219 | 5/1960 | Rapson | 23—152 |
| 3,123,521 | 3/1964 | Wentworth et al. | 252—187 |
| 3,278,447 | 10/1966 | McNicholas | 252—187 |

RICHARD D. LOVERING, Primary Examiner

IRWIN GLUCK, Assistant Examiner

U.S. Cl. X.R.

8—108; 23—152